United States Patent
Kato

(10) Patent No.: US 9,879,972 B2
(45) Date of Patent: Jan. 30, 2018

(54) DISPLACEMENT SENSOR

(71) Applicant: AISIN SEIKI KABUSHIKI KAISHA, Kariya-shi, Aichi-ken (JP)

(72) Inventor: Manabu Kato, Aichi-ken (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 86 days.

(21) Appl. No.: 14/591,105

(22) Filed: Jan. 7, 2015

(65) Prior Publication Data

US 2015/0219433 A1 Aug. 6, 2015

(30) Foreign Application Priority Data

Feb. 3, 2014 (JP) ................. 2014-018477

(51) Int. Cl.
G01B 7/14 (2006.01)
G01D 5/14 (2006.01)

(52) U.S. Cl.
CPC ............... *G01B 7/14* (2013.01); *G01D 5/145* (2013.01)

(58) Field of Classification Search
None
See application file for complete search history.

(56) References Cited

U.S. PATENT DOCUMENTS

| 5,570,015 | A | 10/1996 | Takaishi et al. |
| 9,018,945 | B2* | 4/2015 | Muto ............... G01L 3/104 |
| | | | 324/207.2 |
| 2002/0067260 | A1 | 6/2002 | Tajima et al. |
| 2003/0094941 | A1* | 5/2003 | Mizutani .......... G01D 5/145 |
| | | | 324/207.2 |
| 2004/0061495 | A1* | 4/2004 | Shimomura ....... G01D 5/145 |
| | | | 324/207.25 |
| 2006/0158180 | A1* | 7/2006 | Sato ................. G01D 5/145 |
| | | | 324/207.25 |

(Continued)

FOREIGN PATENT DOCUMENTS

| EP | 0620647 A2 | 10/1994 |
| EP | 1158275 A1 | 11/2001 |

(Continued)

OTHER PUBLICATIONS

Communication dated Jun. 12, 2015, issued by the European Patent Office in counterpart Application No. 15153445.0.

(Continued)

*Primary Examiner* — Melissa Koval
*Assistant Examiner* — Felicia Farrow
(74) *Attorney, Agent, or Firm* — Sughrue Mion, PLLC

(57) ABSTRACT

A displacement sensor includes: an first yoke that is formed of a soft magnetic body and is annular-shaped; an second yoke that is formed of a soft magnetic body and is annular-shaped, the second yoke having an inner circumferential surface which faces an outer circumferential surface of the first yoke via a gap and arranged coaxially with the first yoke; a magnet that is arranged to be capable of moving in an axial direction in a radial-direction central portion of the first yoke and is magnetized in the axial direction of the first yoke; and a detection element that detects a magnetic flux density which is generated in the gap and is arranged in the gap so that the magnetic flux density is detected along the radial direction of the first yoke.

6 Claims, 4 Drawing Sheets

(56) References Cited

U.S. PATENT DOCUMENTS

| | | | | |
|---|---|---|---|---|
| 2010/0060268 A1* | 3/2010 | Tokunaga | ............... | G01D 5/145 |
| | | | | 324/207.2 |
| 2014/0182986 A1* | 7/2014 | Nakajima | ............... | B60G 17/08 |
| | | | | 188/313 |
| 2014/0184204 A1* | 7/2014 | Kouno | ................... | G01B 7/003 |
| | | | | 324/207.13 |
| 2015/0221426 A1* | 8/2015 | Furuki | ................... | H01H 19/11 |
| | | | | 335/219 |

FOREIGN PATENT DOCUMENTS

| | | | |
|---|---|---|---|
| JP | 2002-139301 | A | 5/2002 |
| JP | 2005300247 | A | 10/2005 |
| JP | 2008151628 | A | 7/2008 |
| JP | 2009-042154 | A | 2/2009 |
| JP | 2009145086 | A | 7/2009 |
| JP | 2014-077778 | A | 5/2014 |

OTHER PUBLICATIONS

Communication dated Nov. 14, 2017 from the Japanese Patent Office in counterpart Japanese application No. 2014-018477.

* cited by examiner

DISPLACEMENT SENSOR

CROSS REFERENCE TO RELATED APPLICATIONS

This application is based on and claims priority under 35 U.S.C. § 119 to Japanese Patent Application 2014-018477, filed on Feb. 3, 2014, the entire contents of which are incorporated herein by reference.

TECHNICAL FIELD

This disclosure relates to a displacement sensor that detects the amount of displacement of a moving body in linear movement.

BACKGROUND DISCUSSION

According to the related art, techniques for detecting the amount of displacement of a moving body in linear movement have been used. Examples of such techniques include the following JP 2002-139301A (Reference 1) and JP 2009-42154A (Reference 2).

A differential transformer-type displacement sensor that is described in Reference 1 is configured for an induced electromotive force to be generated in two secondary coils by an alternating current flowing in a primary coil. The induced electromotive force that is generated in the two secondary coils changes depending on displacement of a magnetic body core which is capable of reciprocating, and the differential transformer detects the amount of movement of the magnetic body core from a potential fluctuation.

A position sensor that is described in Reference 2 is configured to be provided with a reciprocating movable yoke, a ring-shaped fixed yoke that is disposed in a state of being inserted into the movable yoke, and a magnetic sensor that is arranged between two magnets which are arranged in parallel to the movable yoke. No magnetic flux passes through the magnetic sensor when the movable yoke is positioned at the center. The magnetic flux passes through the magnetic sensor when the movable yoke is displaced from the center. The position sensor detects the amount of displacement by detecting a magnetic flux density through the magnetic sensor.

According to the technique that is described in Reference 1, an auxiliary coil is used so as to improve detection sensitivity in an end portion in a direction of movement. However, a range of coil arrangement has to be wider than a range of movement of the magnetic body core, and thus an axial-direction length of the coil increases to pose a mountability problem. According to the technique that is described in Reference 2, the magnet is arranged in parallel to the direction in which the movable yoke can be moved, and the density of the magnetic flux that passes through the magnetic sensor is affected by a distance between the yoke and the magnet. In addition, the magnetic flux density that is detected by the magnetic sensor becomes erroneous when the movable yoke causes an axial misalignment vertical to a direction of the displacement. Accordingly, an output fluctuation increases with respect to the axial misalignment of the movable yoke. According to the technique that is described in Reference 2, a combined length of the two magnets and the magnetic sensor is equal to or larger than the amount of displacement. This poses a mountability problem in the sensor as is the case with the technique that is described in Reference 1.

SUMMARY

Thus, a need exists for a small displacement sensor which is not suspectable to the drawback mentioned above.

A displacement sensor according to an aspect of this disclosure includes an first yoke that is formed of a soft magnetic body and is annular-shaped, an second yoke that is formed of a soft magnetic body and is annular-shaped, the second yoke having an inner circumferential surface which faces an outer circumferential surface of the first yoke via a gap and arranged coaxially with the first yoke, a magnet that is arranged to be capable of moving in an axial direction in a radial-direction central portion of the first yoke and is magnetized in the axial direction of the first yoke, and a detection element that detects a magnetic flux density which is generated in the gap and is arranged in the gap so that the magnetic flux density is detected along the radial direction of the first yoke.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, a displacement sensor 1 according to a first embodiment will be described in detail.

Figure 1:
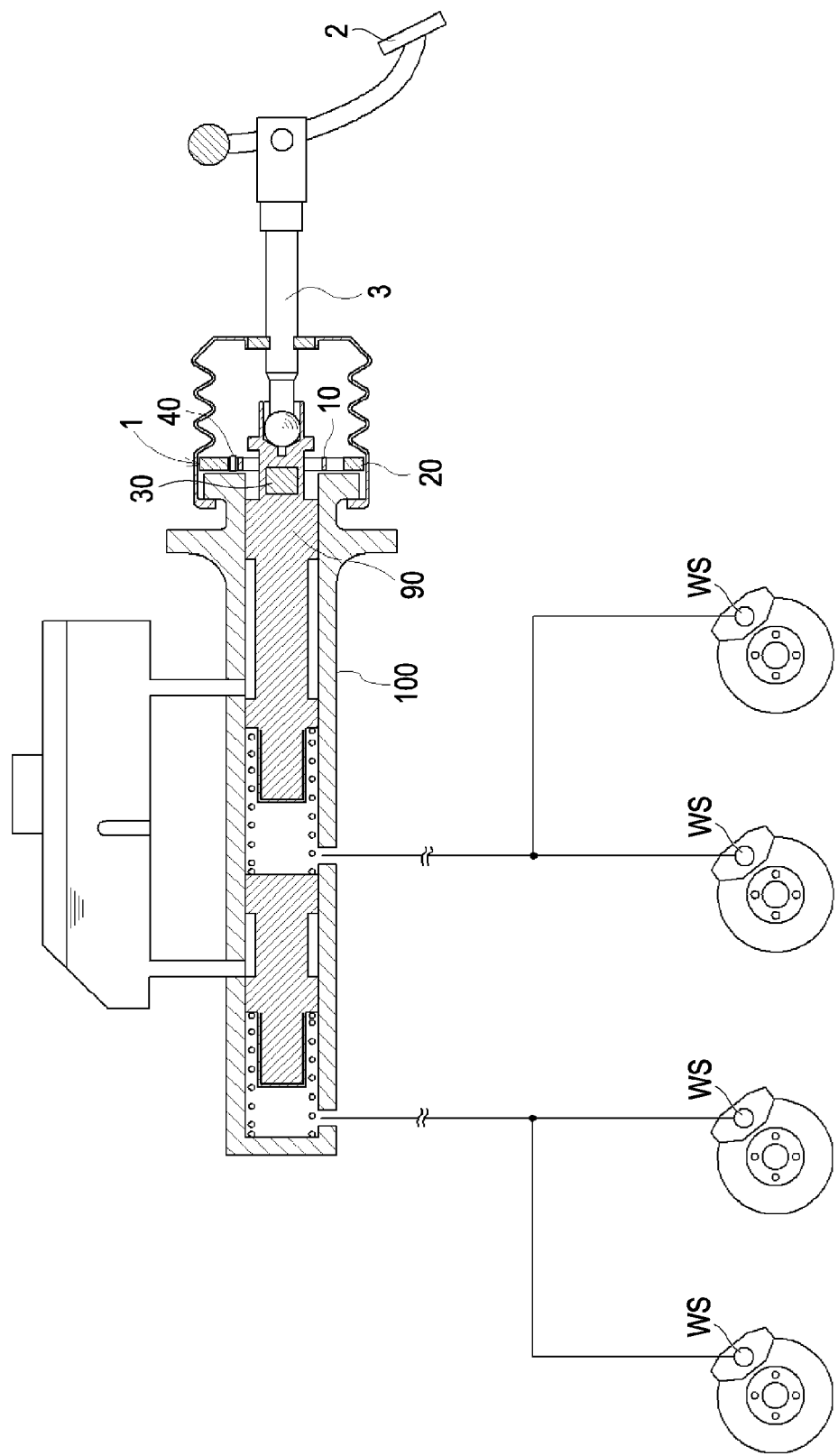
FIG. 1 is a diagram illustrating an example of a case where a displacement sensor is applied to a brake system.

FIG. 1 illustrates an overview of the displacement sensor 1 according to the first embodiment. The displacement sensor 1, for example, detects the amount of displacement of a piston 90 that is inserted into a master cylinder 100 of a vehicle brake. The piston 90 is slidingly moved in response to stepping on a brake pedal 2. When the amount of displacement of the piston 90 is detected, the amount of stepping on the brake pedal 2, that is, the amount of a brake operation by a driver can be estimated. The amount of displacement of the piston 90 is used in braking force control by an electronically controlled brake system, and information such as the amount of displacement and a displacement speed of the piston 90 is used in emergency brake operation sensing during brake assist when a braking force is increased than during normal brake at an emergency. In a case where a motor-based regeneration brake and a friction-based mechanical brake are used in combination with each other as in a hybrid car or the like, the amount of displacement of the piston 90 is used in determining a target value of a combined braking force of the regeneration brake and the mechanical brake.

Figure 2:
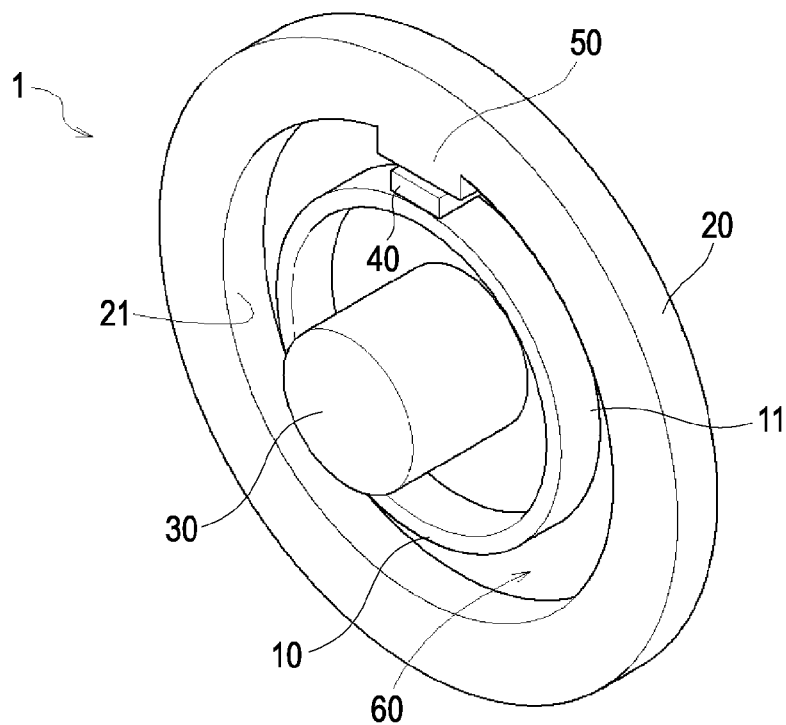
FIG. 2 is a perspective view of the displacement sensor.
Figure 3:
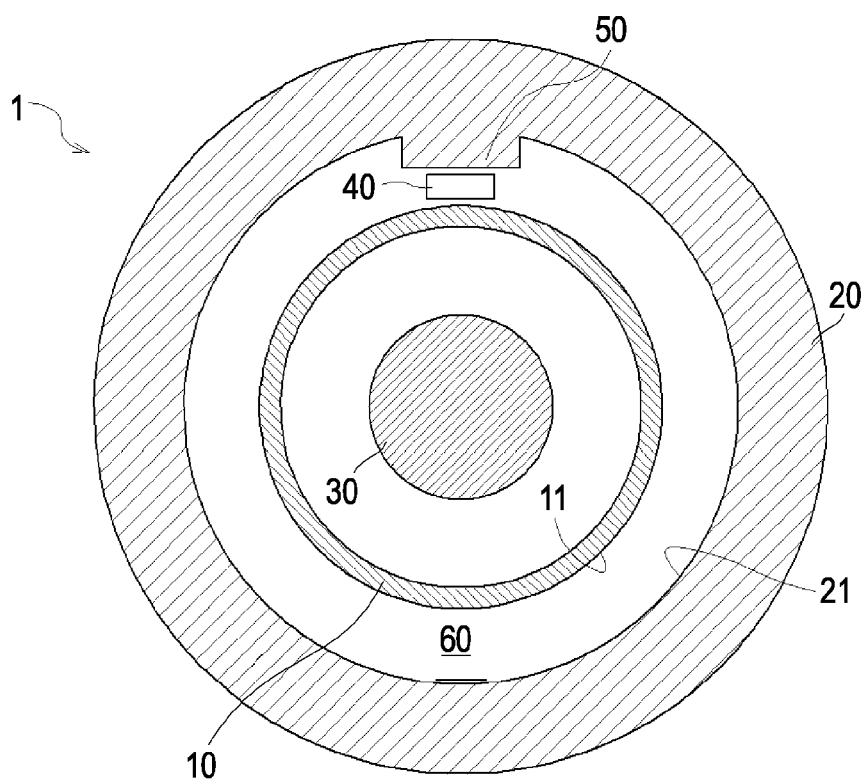
FIG. 3 is a view in which the displacement sensor is viewed from an axial-direction outer side of a first yoke.

FIG. 2 is a perspective view of the displacement sensor 1, and FIG. 3 is a front view of the displacement sensor 1. As illustrated in FIGS. 2 and 3, the displacement sensor 1 is configured to be provided with a first yoke 10, a second yoke 20, a magnet 30, and a detection element 40. Preferably, the first yoke 10 and the second yoke 20 are configured to be annular-shaped soft magnetic bodies and be formed of a material high in magnetic permeability and small in coercive force such as a silicon steel plate, permalloy, and permendur. More preferably, the first yoke 10 and the second yoke 20 are high in saturation magnetic flux density.

The second yoke 20 is arranged coaxially with the first yoke 10, and the second yoke 20 has an inner circumferential surface 21 that faces an outer circumferential surface 11 of the first yoke 10 via a gap 60. In the first embodiment, the first yoke 10 and the second yoke 20 are formed to have the same axial-direction length.

In the first embodiment, a protruding portion 50 that reduces a width of the gap 60 and is formed of a soft magnetic body is disposed on the inner circumferential surface 21 of the second yoke 20. In other words, the protruding portion 50 is formed to protrude to a center side from the inner circumferential surface 21 of the second yoke 20. The protruding portion 50 may be formed integrally with the second yoke 20. Alternatively, the protruding portion 50 may be separately formed and mounted on the second yoke 20. Preferably, the inner circumferential surface of the first yoke 10 and the outer circumferential surface of the second yoke 20 are coaxially arranged in the first embodiment.

Figure 4:
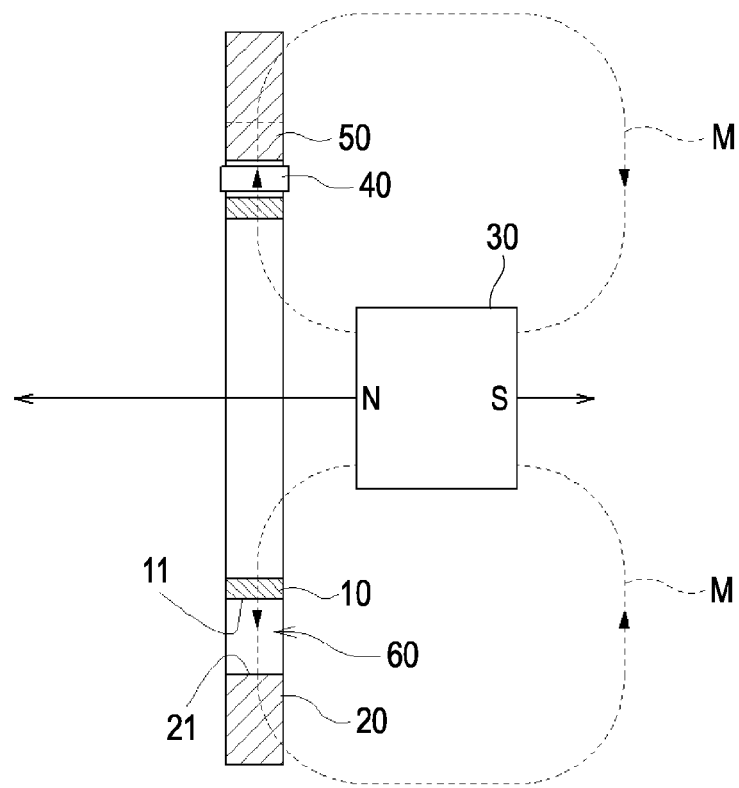
FIG. 4 is a diagram illustrating a path of movement of a magnet.

The magnet 30 is arranged to be capable of moving in an axial direction in a radial-direction central portion of the first yoke 10. FIG. 4 illustrates a side cross-section of the displacement sensor 1. In the first embodiment, the magnet 30 having a columnar shape is used as illustrated in FIGS. 2 and 4. The magnet 30 reciprocates in the axial direction of the first yoke 10 as illustrated by the solid-line arrow in FIG. 4.

The detection element 40 detects a magnetic flux density that is generated in the gap 60 between the outer circumferential surface 11 of the first yoke 10 and the inner circumferential surface 21 of the second yoke 20. The magnetic flux density is detected in a direction along a radial direction.

In the first embodiment illustrated in FIG. 4, the detection element 40 is arranged at a part of the gap 60 where the width is reduced by the protruding portion 50.

As illustrated in FIG. 4, the magnet 30 is magnetized so that an end face toward one side in the axial direction of the first yoke 10 has an N pole and an end face toward the other side in the axial direction of the first yoke 10 has an S pole. When a point where an axial-direction center of the first yoke 10 matches the center of the magnet 30 is assumed to be a starting point, a magnetic flux from the first yoke 10 toward the second yoke 20, that is, a magnetic flux passing through the detection element 40 from the first yoke 10 toward the second yoke 20 is formed in the gap 60 if the magnet 30 is on a right side from the starting point and the magnetic flux passes through the detection element 40 in the opposite direction if the magnet 30 is on a left side from the starting point because of the configuration described above. The magnetic flux density through the detection element 40 increases in magnitude as a result of a displacement of the magnet 30 from the starting point. The magnetic flux density reaches an extremely high value, begins to decrease, and becomes asymptotic to zero. As a result of the displacement of the magnet 30 from the starting point, one of the end faces of the magnet 30 approaches the first yoke 10 and a magnetic resistance between the one end face and the first yoke 10 decreases, and the other end face of the magnet 30 becomes distant from the first yoke 10 and a magnetic resistance between the other end face and the first yoke 10 increases. A positional relationship between the second yoke 20 and both of the end faces of the magnet 30 changes in a similar manner. Since the second yoke 20 is arranged to surround the first yoke 10, a rate of distance change between the second yoke 20 and both of the end faces of the magnet 30 is low, and a rate of magnetic resistance change between the second yoke 20 and both of the end faces of the magnet 30 is lower than a rate of magnetic resistance change between the first yoke 10 and both of the end faces of the magnet 30. Accordingly, the gap 60 increases in magnetic flux density for the displacement of the magnet 30 from the starting point. In a case where the entire magnet 30 is present to the right or left from the first yoke 10 due to the further displacement of the magnet 30, a magnetic path as illustrated in FIG. 4 is formed, the magnet 30 becomes more distant from the first yoke 10 and the second yoke 20 as a result of the displacement of the magnet 30, the magnetic resistance increases, and the gap 60 decreases in magnetic flux density.

Figure 5:
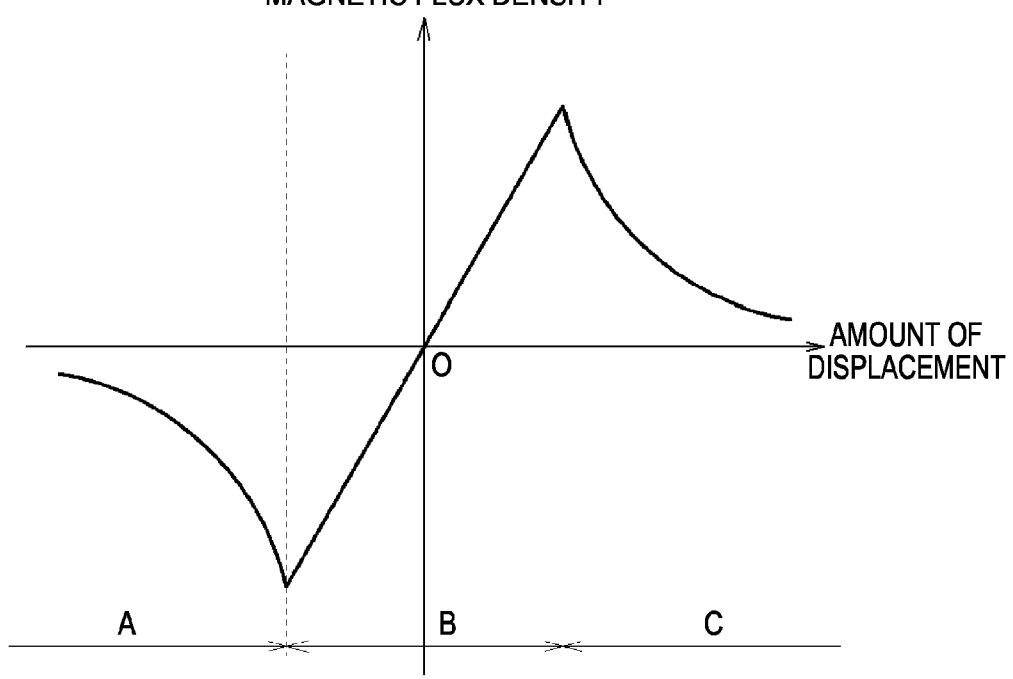
FIG. 5 is a diagram illustrating a magnetic flux density through a detection element with respect to the amount of displacement from a starting point of the magnet.

FIG. 5 illustrates an example of the magnetic flux density through the detection element 40 with respect to the amount of displacement of the magnet 30 from the starting point. In FIG. 5, the vertical axis represents the magnetic flux density through the detection element 40, and the horizontal axis represents the amount of displacement of the magnet 30 from the starting point and in the axial direction of the first yoke 10.

An area A on a left side from a position where the magnetic flux density has a minimum value, an area B where the magnetic flux density monotonically increases with respect to the displacement of the magnet 30 close to the starting point, and an area C on a right side from a position where the magnetic flux density has a maximum value are illustrated in FIG. 5. In each of the areas, a position of the magnet 30 is uniquely determined by the detected magnetic flux density. If a sensing mechanism capable of distinguishing whether the magnet 30 is in the area A or the area B or is in the area B or the area C is used in combination, the amount of displacement over the entire areas of the area A, the area B, and the area C can be detected by using the single magnet 30.

Another Embodiment

In the first embodiment described above, a reference point for the displacement sensor 1 is not limited to the starting point in FIG. 5, that is, the zero magnetic flux density point. Although a reference point output has to be corrected with a circuit in this case, the magnet 30 has temperature characteristics and thus the magnetic flux density through the detection element 40 at the reference point also has temperature characteristics and an output of the displacement sensor 1 is also fluctuated by environmental temperature change. The output fluctuation close to the reference point is an output error, and the error becomes relatively large close to the reference point where the output change due to the displacement of the magnet 30 is small.

In order to reduce the error, it is effective to add a magnet (hereinafter, referred to as a "temperature characteristic correction magnet 70") that has the same temperature characteristics as the magnet 30 to a fixed portion between the first yoke 10 and the second yoke 20 and the like and cancel the magnetic flux density through the detection element 40 at the reference point. If a temperature of the added temperature characteristic correction magnet 70 is substantially identical to a temperature of the magnet 30, the magnetic flux density through the detection element 40 attributable to the magnet 30 is cancelled by the temperature characteristic correction magnet 70, without exception, at the reference point. Accordingly, a fluctuation due to sensor output temperature change at the reference point can be suppressed.

Figure 6:
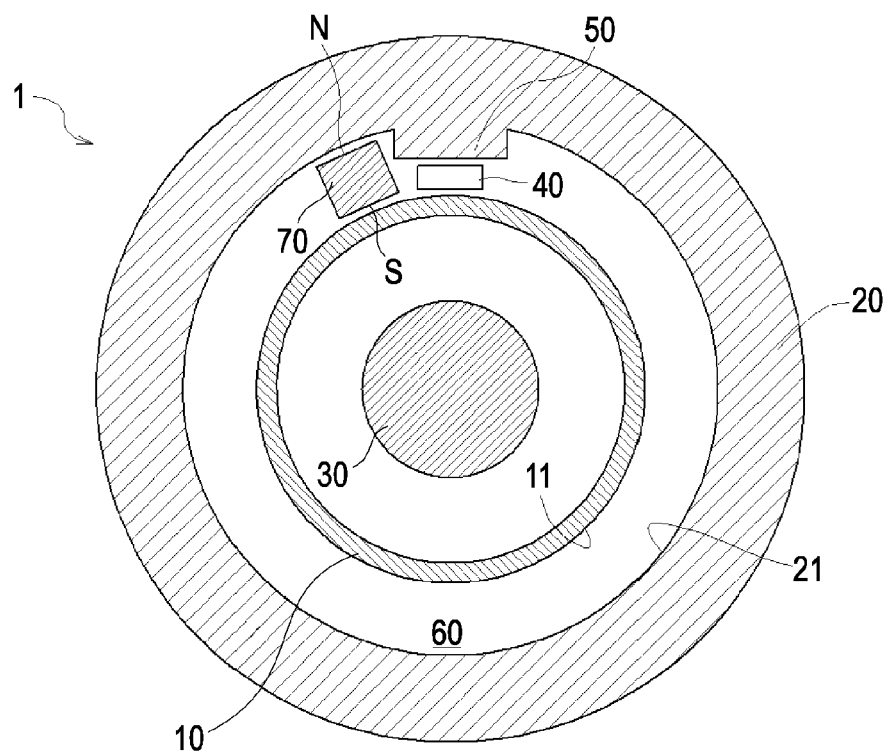
FIG. 6 is a view illustrating a temperature characteristic correction magnet arrangement example.

For example, in a case where the reference point for the displacement sensor 1 is set for the amount of displacement in FIG. 5 to be on a positive side, it is preferable that the temperature characteristic correction magnet 70 be arranged to have an S pole toward the first yoke 10, have an N pole toward the second yoke 20, and be adjacent to the detection element 40 in a circumferential direction of the first yoke 10 as illustrated in FIG. 6.

In this case, the magnetic flux density through the detection element 40 attributable to the magnet 30 is cancelled by the temperature characteristic correction magnet 70 and decreases at the reference point for the displacement sensor 1. Accordingly, the output fluctuation at the reference point attributable to the temperature characteristics of the magnet 30 can be suppressed.

In a case where the reference point for the displacement sensor 1 is set for the amount of displacement in FIG. 5 to be on a negative side, the temperature characteristic correction magnet 70 is arranged to have the N pole toward the first yoke 10, have the S pole toward the second yoke 20, and be adjacent to the detection element 40 in the circumferential direction of the first yoke 10, contrary to a case where the reference point for the displacement sensor 1 is set for the amount of displacement to be on the positive side, and the magnetic flux density through the detection element 40 at the reference point can be cancelled.

Figure 7:
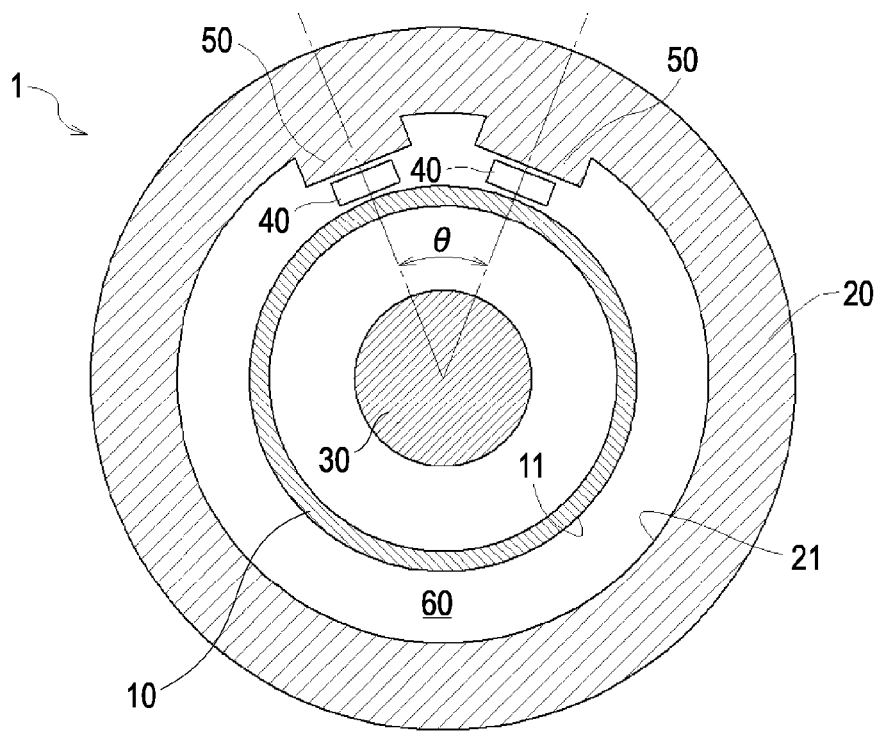
FIG. 7 is a view in which a displacement sensor according to another embodiment is viewed from an axial-direction outer side of a first yoke.

In the first embodiment described above, an example in which only one detection element 40 is disposed has been described. However, a plurality of the detection elements 40 may be arranged in the gap 60 as illustrated in FIG. 7. In a case where the plurality of detection elements 40 are arranged and any one of the detection elements 40 becomes abnormal, an output becomes different from an output of the other detection elements 40 and an abnormality of the displacement sensor 1 can be detected.

In a configuration in which three or more detection elements 40 are provided, abnormal-output detection elements 40 are identified when at least half of the detection elements 40 are in normal operation so that not only the abnormality of the displacement sensor 1 can be detected as described above but also the output of the displacement sensor 1 can be calculated by using the outputs of the detection elements 40 in normal operation. Accordingly, the displacement sensor 1 can be improved in reliability.

In the first embodiment described above, an example in which the protruding portion 50 is formed to protrude to a radial-direction inner side from the inner circumferential surface 21 of the second yoke 20 has been described. However, the protruding portion 50 may protrude to a radial-direction outer side from the outer circumferential surface 11 of the first yoke 10. The protruding portion 50 may be disposed on both the outer circumferential surface 11 of the first yoke 10 and the inner circumferential surface 21 of the second yoke 20.

A plurality of the protruding portions 50 can be provided on the outer circumferential surface 11 of the first yoke 10 or on the inner circumferential surface 21 of the second yoke 20. In an alternative configuration, at least one protruding portion 50 can be provided on each of the outer circumferential surface 11 of the first yoke 10 and the inner circumferential surface 21 of the second yoke 20. FIG. 7 illustrates an example of a case where the plurality of detection elements 40 are provided on the inner circumferential surface 21 of the second yoke 20.

When the first yoke 10 is viewed in the axial direction, the plurality of protruding portions 50 are arranged in a fan-shaped arc shape with a central angle θ of 120 degrees or less as illustrated in FIG. 7. The protruding portions 50 are not arranged in the opposite direction across the center of the yoke. Accordingly, the magnetic flux density attributable to a disturbance magnetic field through the detection elements 40 can be suppressed, and detection accuracy of the displacement sensor 1 can be improved.

In a case where the two detection elements 40 are arranged in the gap 60 as illustrated in FIG. 7, the temperature characteristic correction magnet 70 (not illustrated) may be arranged between the two detection elements 40. According to this configuration, the magnetic flux density through the two detection elements 40 at the reference point for the displacement sensor 1 attributable to the magnet 30 can be equivalently cancelled by the single temperature characteristic correction magnet 70.

In the first embodiment described above, a case where the displacement sensor 1 detects the amount of displacement of the piston 90 that is inserted into the master cylinder 100 of the vehicle brake has been described as an example. However, the displacement sensor 1 can also be applied to other applications.

This disclosure can be used in a displacement sensor that detects the amount of displacement of a moving body in linear movement.

A displacement sensor according to an aspect of this disclosure includes an first yoke that is formed of a soft magnetic body and is annular-shaped, an second yoke that is formed of a soft magnetic body and is annular-shaped, the second yoke having an inner circumferential surface which faces an outer circumferential surface of the first yoke via a gap and arranged coaxially with the first yoke, a magnet that is arranged to be capable of moving in an axial direction in a radial-direction central portion of the first yoke and is magnetized in the axial direction of the first yoke, and a detection element that detects a magnetic flux density which is generated in the gap and is arranged in the gap so that the magnetic flux density is detected along the radial direction of the first yoke.

According to this configuration, the first yoke and the second yoke are arranged across the detection element, and thus a magnetic path is formed between the first yoke and the second yoke so that the two yokes are linked in the radial direction and the magnetic flux from the magnet can be efficiently collected in the detection element. Accordingly, axial-direction lengths of the first yoke and the second yoke can be smaller than a range in which the magnet can be moved, and the displacement sensor can be reduced in size. Since the second yoke is arranged to surround an outer side of the first yoke, the second yoke constitutes a path with a low magnetic resistance, and an effect of a disturbance magnetic field that acts from an outer side of the displacement sensor can be suppressed.

In a case where a center of movement of the magnet is misaligned from an axial center of the first yoke, a part where a distance between the magnet and each of the yokes is reduced is present with a part where the distance between the magnet and each of the yokes is increased and change in the amount of the magnetic flux through one of the parts is compensated with change in the amount of the magnetic flux through the other one of the parts according to this configuration. Accordingly, an effect of the axial misalignment of the center of movement of the magnet can be reduced.

It is preferable that a protruding portion that is formed of a soft magnetic body and reduces a width of the gap is disposed on at least one of the outer circumferential surface of the first yoke and the inner circumferential surface of the second yoke, and the detection element is arranged at a part of the gap where the width is reduced by the protruding portion.

According to this configuration, the magnetic resistance decreases at the narrow part where the protruding portion is disposed, and the magnetic flux collected in the first yoke can be easily transmitted to the second yoke via the protruding portion. Accordingly, the magnetic flux is concentrated on the detection element that is disposed close to a tip of the protruding portion, and sensitivity of the displacement sensor can be improved.

It is preferable that, when a plurality of the protruding portions are disposed, the protruding portions are arranged on a fan-shaped arc with a central angle of 120 degrees or less when the first yoke is viewed in the axial direction.

For example, the effect of the disturbance magnetic field is more likely to act, depending on the arrangement of the plurality of protruding portions, in a case where a plurality of the detection elements are arranged between the first yoke and the second yoke and the protruding portions are disposed to correspond to the respective detection elements. In a case where two protruding portions are symmetrically positioned across central positions of the respective yokes and a direction in which the two protruding portions are connected matches a direction of the disturbance magnetic field, the detection elements that are arranged close to the tips of the two protruding portions are easily affected by the disturbance magnetic field. Accordingly, both of the detection elements become erroneous at the same time, and detection accuracy is impaired.

According to this configuration, each of the protruding portions is arranged in a fan-shaped area of 120 degrees or less from the center of the yoke in a case where the plurality of protruding portions are disposed. In this case, the plurality of protruding portions are not arranged at symmetrical positions across the central position of the yoke, the magnetic flux density through the detection element arranged close to the tip of the protruding portion, which is attributable to the disturbance magnetic field, decreases, and the detection accuracy of the displacement sensor can be improved. Also, the plurality of protruding portions can be arranged in the fan-shaped area with positions changed in the axial direction of the first yoke.

It is preferable that a plurality of the detection elements are arranged in the gap in a circumferential direction of the first yoke.

According to this configuration, all of the detection elements should show the same detection value if each of the detection elements is in normal operation. Accordingly, it can be easily found that any one of the detection elements has become abnormal in a case where any one of the plurality of detection elements is subjected to an abnormal output. If the number of the detection elements is three or more, an accurate displacement sensor output can be output by identifying the detection element subjected to the abnormal output and using the detection elements other than the detection element subjected to the abnormal output.

It is preferable that a magnet that has the same temperature characteristics as the magnet is arranged relatively fixedly on the first yoke and the second yoke.

If a temperature of the fixedly arranged magnet is substantially equal to a temperature of the movably arranged magnet, the magnetic flux density through the detection element attributable to the movably arranged magnet is cancelled by the fixedly arranged magnet, without exception, at a reference point for the displacement sensor according to this configuration. Accordingly, a fluctuation due to sensor output temperature change at the reference point can be suppressed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A displacement sensor comprising:
   a first yoke that is formed of a soft magnetic body and is annular-shaped;
   a second yoke that is formed of a soft magnetic body and is annular-shaped, the second yoke having an inner circumferential surface which faces an outer circumferential surface of the first yoke via a gap and arranged coaxially with the first yoke;
   a magnet that is arranged to be capable of moving in an axial direction of the first yoke, the magnet being provided in a central portion of the first yoke and being magnetized in the axial direction of the first yoke; and
   a detection element that detects a magnetic flux density which is generated in the gap, the detection element being arranged in the gap so that the magnetic flux density is detected along a radial direction of the first yoke, the axial direction of the first yoke being a direction of a center axis of the first yoke,
   wherein the displacement sensor measures an amount of linear displacement of the magnet.

2. The displacement sensor according to claim 1,
   wherein a protruding portion that is formed of a soft magnetic body and reduces a width of the gap is disposed on at least one of the outer circumferential surface of the first yoke and the inner circumferential surface of the second yoke, and
   the detection element is arranged at a part of the gap where the width is reduced by the protruding portion.

3. The displacement sensor according to claim 2,
   wherein a plurality of the protruding portions are disposed and arranged on a fan-shaped arc with a central angle of 120 degrees or less when the first yoke is viewed in the axial direction.

4. The displacement sensor according to claim 1,
   wherein a plurality of the detection elements are arranged in the gap in a circumferential direction of the first yoke.

5. The displacement sensor according to claim 1,
   wherein a second magnet that has same temperature characteristics as the magnet is arranged on a fixed portion between the first yoke and the second yoke.

6. A braking assembly comprising:
   a brake pedal, a cylinder housing a piston, wherein the piston is connected to the piston is linearly displaced in response to movement of the brake pedal, a displacemnt sensor comprising:

a first yoke that is formed of a soft magnetic boyd and is annular-sharped;

a second yoke that is formed of a soft magnetic body and is annular-shaped, the second yoke having an inner circumferential surface which faces an outer circumferential surface of the first yoke via a gap and arranged coaxially with the first yoke;

a magnet that is arranged to be capable of moving in an axial direction of the first yoke, the magnet being provided in a central portion of the first yoke and being magnetized in the axial direction of the first yoke; and a detection element that detects a magnetic flux density which is generated in the gap, the detection element hein s arranged in the so that the magnetic flux density is detected along a radial direction of the first yoke, the axial direction of the first yoke being a direction of a center axis of the first yoke, wherein the displacement sensor measures an amount of linear displacement of the magnet, and wherein the displacement sensor detects an amount of linear displacement of the piston in response to the movement of the brake pedal.

\* \* \* \* \*